United States Patent [19]

Richards, Sr.

[11] Patent Number: 4,704,028
[45] Date of Patent: Nov. 3, 1987

[54] VACUUM PRINTING FRAME

[76] Inventor: Chester L. Richards, Sr., 1610 Sheridan Rd., Glendale, Calif. 91206

[21] Appl. No.: 822,016

[22] Filed: Jan. 24, 1986

[51] Int. Cl.[4] .......................................... G03B 27/20
[52] U.S. Cl. .................................................. 355/92
[58] Field of Search ..................... 355/91, 92, 93, 94, 355/95, 76, 73, 87

[56] References Cited

U.S. PATENT DOCUMENTS

| 263,242 | 8/1882 | Street | 355/92 |
|---|---|---|---|
| 628,347 | 7/1899 | McDade | 355/94 |
| 725,969 | 4/1903 | Jaray | 355/92 |
| 2,139,956 | 12/1938 | Huebner | 355/91 |
| 3,007,390 | 11/1961 | Forester et al. | 355/94 |
| 3,510,217 | 5/1970 | Cirimele et al. | 355/92 X |
| 3,547,537 | 12/1970 | Betron | 355/92 |
| 3,955,163 | 5/1976 | Novak | 355/91 X |
| 3,995,955 | 12/1976 | Töpfer | 355/91 |
| 4,087,181 | 5/1978 | Alexander et al. | 355/92 |
| 4,484,813 | 11/1984 | Maher et al. | 355/93 |
| 4,504,142 | 3/1985 | Richards, Sr. | 355/92 |

Primary Examiner—L. T. Hix
Assistant Examiner—Brian W. Brown
Attorney, Agent, or Firm—Popper, Bobis & Jackson

[57] ABSTRACT

A vacuum printing frame includes a backing plate; a pressurizable bladder assembly positioned on the backing plate, the bladder assembly including a lower wall positioned on the backing plate, a plurality of partitions sealed around lower edges thereof to the lower wall and defining a series of interconnected, nested chambers arranged in alignment from and pressurizable from a head end to a foot end of the vacuum printing frame, and a plurality of holes in each partition at positions close to the securement of the respective partition to the lower wall to provide fluid communication between adjacent bladder chambers; a flexible, fluid impervious membrane positioned above the bladder assembly for supporting a mask and photosensitive sheet; a transparent plate movable between an open position for permitting the mask and photosensitive sheet to be positioned on the membrane, and a closed position for sandwiching the mask and photosensitive sheet between the membrane and the transparent plate in an evacuation region defined between the membrane and the transparent plate; a blower for supplying air under pressure to the bladder assembly when the transparent plate is in the closed position to apply a force pressing the photosensitive sheet and mask against the transparent plate in a predetermined spatial pattern, starting from an innermost chamber at the head end to an outmost chamber; and an evacuation port fluidly connected with the evacuation region for evacuating the same, the evacuation port positioned at the head end of the vacuum frame.

12 Claims, 3 Drawing Figures

VACUUM PRINTING FRAME

BACKGROUND OF THE INVENTION

The present invention relates to photographic printing and, more particularly, is directed to an improved vacuum frame.

One of the most useful tools in the graphic arts industry is the vacuum contact frame which is used for making contact photographic prints. The vacuum frame should be distinguished from the vacuum platen or easel, which is used in cameras or enlargers, to hold large sheets of film at the focal plane of the camera lens or in focus. In contact printing, a transparent mask sheet is placed in intimate contact with a sheet of light sensitive material.

In the two major graphic arts applications, the light sensitive material may be photographic film or photo sensitive printing plates. For this discussion, the photo-sensitive medium will be referred to as a film. The mask may contain a positive or negative image, depending on whether the photo sensitive material responds in a positive or negative way to light (e.g. some photo printing plates are positive responding). During the exposure, light passes through the mask and onto light sensitive film. Where the mask is opaque, the light is blocked and the underlying photo film remains unexposed. By this means, the pattern of the mask is transferred to the photo film.

In order to retain sharpness during the transfer exposure, it is necessary for the mask and photo film to be in intimate contact. If the mask and film sheets are merely pressed together, bubbles of air will remain between them and the resulting uncontrolled separation will cause local blurring and loss of definition of the transferred image.

Vacuum frames have been in use for many years to help prevent this problem. In the vacuum frame, the mask and film are placed under a glass top plate and are supported on the bottom by a flexible pressure blanket. The edges of the blanket are sealed against the glass plate in such a way that the glass and blanket together, form an air-tight chamber. The air may then be drawn out of the resulting glass/blanket chamber. This evacuation of air from the chamber causes the external air at ambient pressure to force the blanket up against the mask/film sandwich. The force of the blanket against the film helps force out the air from between the film sheets. A vacuum pump draws off this air so that, once full contact between the sheets is made, the contact will remain for the duration of the evacuation.

There are two significant problems with this arrangement. The first is that it takes substantial time to withdraw the air from the space between the film sheets, after the volume defined by the blanket has been evacuated. A second problem is that under strong vacuum, the high pressure of the blanket tends to press the edges of the film sheets together so as to form a seal which traps a residuum of air between the sheets, thus creating bubbles or pockets in which air is trapped. These bubbles keep portions of the mask and photo film separated, which results in blurred images. Moreover, the bubbles are not spatially stabilized and may "wander" around during the course of a long duration exposure.

Early attempts to alleviate the problem of trapped air bubbles involved pressing inflated bladders against the back of the mask/photo material sandwich. No attempt was made, in these early versions, to evacuate the sandwich region. An example is the photographic blueprint apparatus which is the subject of U.S. Pat. No. 628,347 to McDade. This device consists of a simple frame with a glass top in which a single chambered, hand inflated bladder presses against the back of the photo medium sandwich.

A patent from a slightly later time, U.S. Pat. No. 725,969 to Jarney, shows a mechanically pumped bladder arrangement which also includes a roller that is designed to squeeze out residual trapped bubbles of air.

More recently, U.S. Pat. No. 3,995,955, to Topfer, teaches the use of a simple inflatable backing bladder, in conjunction with a vacuum frame, to squeeze out remaining bubbles of air and speed the evacuation process. It should be noted that the combination fails to regulate or monitor the air flow.

U.S. Pat. No. 3,510,217 to Cirimele et al. discusses the problem, in Column 1, Lines 44–56 thereof, of small air gaps or bubbles being formed between the photoconductive plate and the charge retentive surface of the electrographic paper, which prevents formation of a charge image on those portions of the paper which are coextensive with the bubbles. In accordance with the invention therein, which is used in an electrographic camera, the photoconductive plate is supported from a glass plate, and a supply roll of electrographic recording paper is provided, with a strip thereof being disposed overlaying the photoconductive plate. The electrographic paper comprises a thin film of dielectric coated on a conductive paper backing and which forms a charge retentive surface. In accordance with the invention, a soft elastic pressure pad assembly is provided which is formed by a soft elastic pad of sponge rubber and a thin flexible skin of non-porous rubber thereover. The pad has a dome-shaped surface which abuts the paper and which is flattened when pushed against the photoconductive plate.

As stated at Column 3, Lines 12–22, the purpose of this dome-shape is to permit the pressure pad to squeeze the air, in the spaces between the paper and the photoconductive plate, outwardly from the center of the plate towards its edge as the pad is pressed against the paper and the plate. This prevents air bubbles from being trapped between the paper and the plate. Such air bubbles prevent a nominal contact between the paper and the plate, and thus, prevent uniformity in the charge transfer to the charge retentive surface of the electrographic paper. The pad is further provided with diagonally crossed slots for further assisting in squeezing air out of the spaces between the paper and the plate.

FIG. 4 of the Patent shows an alternative pressure pad assembly comprised of a flat dome-shaped bag made of rubber and filled with a fluid such as air or water. The operation and purpose of this latter embodiment is identical to that of the pressure pad, that is, for squeezing air from the center towards the ends between the two sheets.

U.S. Pat. No. 3,007,390 to Forester et al. discloses an arrangement similar to U.S. Pat. No. 3,510,217, having particular applicability to a vacuum frame. The blanket is mounted under tension so that contact with the superimposed sheet is made first at the center of the vacuum frame, then moves progressively outwardly with an ironing effect so as to eliminate the formation of bubbles and wrinkles.

U.S. Pat. No. 4,087,181 to Alexander et al. discloses an arrangement providing a glass plate, a thin flexible template positioned thereunder and a composite two layer strip of radiation sensitive material positioned therebetween. A pad of soft resilient flexible material having an upper pressure surface which is angled downwardly from a center pressure ridge is provided. In the inoperative position (FIG. 2), the ridge on the pad is spaced from the strip of material positioned below the template. A plunger assembly moves toward the plate and biases the ridge against the center of the strip material. Subsequent movement of the plunger assembly (FIG. 4) causes the material of the pad to be displaced so that contact between the pressure surface and the strip material increases outwardly to sweep air from between the layers of the strip material.

See also U.S. Pat. Nos. 263,242; 2,139,956; 3,547,537; 3,955,163; and 4,484,813 for different arrangements.

Recently, a vacuum frame has been marketed which uses rollers on the backside of the pressure blanket that move from one edge of the blanket to the other. The purpose of the rollers is to progressively squeeze the air from one edge of the film sandwich to the other. This frame is manufactured by the Theimer Company of Germany. When operating correctly, no air bubbles are left behind in the film sandwich and with such intimate contact it is theoretically possible to obtain sharp, controllable exposures. In practice, however, this roller arrangement has two significant defects. Some bubbles of air still remain, and the combination is slow to operate, requiring substantial set up time before an exposure can be made. This is a significant drawback in, for example, a production environment where time is an important factor.

What has been needed is a new way to extract all of the air from the film sandwich so that no bubbles are left behind. Moreover, the new way should be sufficiently gentle not to impose great pressure on the glass top plate. Further, if the evacuation process can be speeded, the productive efficiency of the vacuum frame will be much improved.

In many of the above-described conventional vacuum frames, a vacuum frame blanket is drawn up against the under surface of a transparent plate of glass as the air is evacuated from between these two elements. A ring of beading material, normally fastened to the periphery of the vacuum blanket forms a seal when this ring is pressed up against the under surface of the glass top plate. The result is an air tight chamber with a rigid glass plate being the upper wall and the flexible blanket acting as the lower wall. Resting on top of the vacuum blanket, and below the glass plate, is a sandwich consisting of a mask sheet which carries a transparency image and a sheet of photosensitive material. The photosensitive material, typically, is either ordinary photographic film or a metal plate which will be later used as a lithographic printing plate. In principle, when the air is evacuated from between the blanket and the glass plate, the mask/film sandwich is pressed firmly against the glass plate. The air is squeezed out from between the mask and the film and the two are placed in such intimate contact that passage of light through the mask will transfer the mask's image to the photographic emulsion.

This is the theory of the vacuum frame. In practice, however, it turns out that the traditional vacuum frame design has substantial deficiencies. The great problem of the conventional design is that the air flow out of the vacuum chamber region between the glass plate and the flexible blanket is not uniform or controlled. It happens that different parts of the vacuum blanket make contact with the glass plate at different times. This causes barriers to form in different parts of the vacuum frame chamber which impede the flow of air, with a consequent slowing of the evacuation process. What is worse, the conventional vacuum frame chamber has a tendency to seal together the edges of the mask/film sandwich before all of the air has been removed from between these two sheets. This means that a thin, uncontrolled, bubble of air is often left between the mask and the film. This bubble significantly degrades the quality of the image transfer during the exposure.

In order to overcome the problems associated with the aforementioned vacuum frames, the Applicant herein invented a novel photographic vacuum contact printing frame, which is the subject of U.S. Pat. No. 4,504,142, the entire disclosure of which is incorporated herein by reference.

This frame has the advantage that it can successfully evacuate the air from between a masking sheet and an unexposed sheet of photosensitive material, in much shorter time than previous frame designs. It also provides a much higher degree of precision in the photographic exposure since the evacuation is much better.

Specifically, the apparatus disclosed therein replaces roller assemblies and single chamber bladders with a progressively inflated, multi-chambered bladder. The bladder is divided into a plurality of interconnected and inflatable chambers. In the preferred embodiment, the chambers are constructed in such a way as to resemble flat pockets which inflate into low ceilinged cavities.

Pressurized air is introduced to a single, innermost chamber, thereby inflating this chamber first. The innermost chamber is surrounded by a nested arrangement of additional chambers.

As the central chamber inflates, air bleeds to the next adjacent chamber, causing its inflation sometime after the inflation of the first chamber. As each chamber of the arrangement is inflated, the inflation of the next chamber begins. This arrangement applies pressure first to a small, central area, and then progressively, to regions closer to the edges of the film sandwich. This radial, "peristaltic" pressure wave gently squeezes the air towards all the edges of the film sandwich in such a way that no air bubbles in the film sandwich are left behind.

A further advantage accrues from the arrangement. Because of the efficiency of the peristaltic motion, the air can be squeezed from between the sheets of film at a much faster rate than heretofore has been possible. This means that the vacuum frame, assisted by the pressurized blanket, can come to full stabilized vacuum in a much shorter period of time with resulting improvements in productivity.

In accordance with the different embodiments, the squeezing may occur starting from a corner, an edge or the middle of the two sheets. The nested bladders or partitions are interconnected by apertures therein so that after the innermost bladder is filled, the air escapes to the next most outer bladder and so on.

This Patent teaches that, in one preferred embodiment, the innermost chamber, and all of the other inner chambers of the nesting arrangement, are offset to one side of the exposure area. This is because the mask/film sandwich is normally held in lateral alignment by a system of pins inserted through holes punched along one edge of the mask and photo film. In order to maintain best alignment, it is important that the pin edge of the film sandwich be pressed together first by the vacuum frame, with the residual air being gently squeezed from this edge towards the far edges of the sandwich. For this reason, the nested chamber arrangement should be skewed towards the pin edge of the exposure area.

However, this preferred embodiment of the Patent has some significant deficiencies. Primary among these is that, during the evacuation process, the air is evacuated first from a non-critical portion of the vacuum frame. Only after this region is cleared, does air from the important part of the frame leave the frame's interior. Moreover, the critical air must flow the length of the vacuum blanket after the blanket is substantially drawn up against the glass top plate. The blanket, of course, contains grooved channels to make this possible. However, the narrowness of the air passage grooves means that the evacuation of the critical air takes much longer than is needed.

Specifically, with this arrangement, the chamber evacuation port was deliberately located at the foot of the nested bladders because it was thought that, as the bladders progressively inflated, they would naturally squeeze the air in the vacuum chamber directly toward the evacuation port. In practice, the squeezing action does occur, but before this squeezing action can take full effect, the air being drawn from the vacuum chamber has already caused the blanket to seal up against the glass in the vicinity of the evacuation port. This creates a barrier at the foot of the inflatable assembly which impedes the evacuation of the air from the head region. This barrier leaves a pocket of air near the head of the mask/film sandwich which takes a significant length of time to evacuate through the grooves in the vacuum blanket. Adjustments to the timing of the inflation and evacuation sequence somewhat moderate the problem, but it is evident that the chamber evacuation is not as swift as it might be.

Further, it is becoming increasingly common for retractable pin type boards to be used to register the mask and film while they are in a vacuum frame. With the frame manufactured and sold according to the Patent, the pin board is placed on top of the blanket in the vacuum frame so that the pins are located at the head of the bladder assembly. It is desirable that the head of the assembly be first evacuated so that accurate alignment of the mask and film assembly will first be obtained. However, due to the aforementioned problem where an air pocket is left near the head of the mask/film sandwich, such alignment at the pins may not occur first.

Another deficiency resulted from the placement of the air bleed holes which communicate from each bladder to the next bladder in the nested sequence. If these holes are not properly placed, they tend to seal up against the fabric of the surrounding bladder and cause a catastrophic failure of the system. Indeed, on several occasions the glass top plate was shattered because of improper inflation of the bladder assembly. Other deficiencies had to do with the materials, and ease and reliability of construction. The deficiencies will be discussed hereinafter.

OBJECTS AND SUMMARY OF THE INVENTION

Accordingly, it is an object of the present invention to provide a vacuum frame utilizing a nested bladder arrangement.

More particularly, it is an object of the present invention to provide a vacuum frame utilizing a nested arrangement in which air is evacuated first from the head of the assembly corresponding to the innermost bladder.

It is another object of the present invention to provide a vacuum frame in which evacuation of air occurs more rapidly.

It is still another object of the present invention to provide a vacuum frame in which there are no trapped air bubbles in operation.

It is yet another object of the present invention to provide a vacuum frame in which there is no impediment to the flow of air from the vacuum chamber.

It is a further object of the present invention to provide a vacuum frame which is compatible with central vacuum systems.

It is a still further object of the present invention to provide a vacuum frame in which it is not necessary to completely evacuate the vacuum chamber before starting the photographic exposure.

It is a yet further object of the present invention to provide a vacuum frame in which inflation of the bladder arrangement and evacuation of the vacuum chamber may begin at the same time.

It is another object of the present invention to provide a vacuum frame which uses a centrifugal blower to effect evacuation.

It is still another object of the present invention to provide a vacuum frame which reduces the danger of the top glass being shattered by overinflation.

It is yet another object of the present invention to provide a vacuum frame in which the mask and film are first firmly pressed together at the location of registration pins to obtain more precise registration of the mask/film arrangement.

In accordance with an aspect of the present invention, a vacuum printing frame comprises a backing plate; a pressurizable bladder assembly positioned on the backing plate, the bladder assembly being constructed to be pressurizable from a head end to a foot end of the vacuum printing frame; flexible, fluid impervious membrane means positioned above the bladder assembly for supporting a mask and photosensitive sheet; transparent plate means movable between an open position for permitting the mask and photosensitive sheet to be positioned on the membrane means, and a closed position for sandwiching the mask and photosensitive sheet between the membrane means and the transparent plate means in an evacuation region defined between the membrane means and the transparent plate means; membrane means and the transparent plate means; pressurizing means for pressurizing the bladder assembly when the transparent plate is in the closed position to apply a force pressing the photosensitive sheet and the mask against the transparent plate in a predetermined spatial pattern, starting at the head end and terminating at the foot end; and evacuation port means fluidly connected with the evacuation region for evacuating the evacuation region, the evacuation port means positioned at the head end of the vacuum frame.

There is no longer any danger of the top glass being over stressed and shattered by the inflation of the bladders. When a blower is used, instead of an air compressor pump, the pressure and rate of flow of air into the bladders may be adjusted by the simple expedient of changing the speed of the motor which drives the blower. The improved air flow which results from using a variable speed blower makes the new embodiment much more compatible for use with central vacuum systems.

A final benefit of the shift in the position of the evacuation port is also very substantial. As aforementioned, it is becoming increasingly common for retractable pin type pins boards to be used to register the mask and film while they are in the vacuum frame. When such a pin board is used with the present invention, the board is placed on top of the blanket in the vacuum frame so that the pins are located near the evacuation port and head of the bladder assembly. The mask/film sandwich, in turn, is mounted on the pin board. The combination of vacuum pull up and bladder inflation causes the mask and film to be firmly pressed together at the location of the pins. This results in precise registration between the mask and film being maintained throughout the evacuation process. The precision of the registration is noticeably improved by the change in position of the evacuation port.

In addition to the shift in the position of the evacuation port, there are other modifications to the vacuum frame system. One change of significance is a shift in the position of the holes which transfer the air from an inner bladder to the next outer bladder, combined with a change in the source of pressurized air. Early production models of the vacuum frame of the aforementioned U.S. Patent had a tendency to overpressurize the bladders. This caused a substantial force to build up on the underside of the glass top plate. There were, as a result, a number of instances where the glass top plate shattered under the resulting stress.

The cause of the over inflation was two-fold. First, the source of air pressure, which was used to inflate the bladders, was too high. This was true even though the air flow was regulated by a valve. The substitution of a centrifugal blower as the pressurized air source used to inflate the bladders, as aforementioned, reduced this pressure, and at the same time, increased the volume flow of air.

Second, the holes which transfer air between the bladders were originally a substantial distance from the attachment edge of the bladder sheet. As each bladder was inflated, the air transfer holes of the bladder were pressed against the sheet of the next bladder in the nested sequence. In effect, the bladder holes became part of the bladder ceiling and were, in turn, pressed up against the ceiling of the next outer bladder. This caused the holes to be sealed off. The air flow between the bladders ceased, or was dramatically slowed down. The innermost fully sealed bladder then over pressurized and caused the glass top plate to shatter.

In accordance with the present invention, the air transfer holes have been moved as close as possible to the edge of the attachment region of the bladder sheet. Now, when a bladder inflates, an air transfer hole becomes part of the side wall of the bladder and is not pressed against the sheet material of the next outer bladder. No sealing of the holes occurs and the pressure within the bladders stays low enough that the integrity of the glass top plate is not endangered.

An additional improvement is a change in the sheet of material used for the wall and ceiling of the various bladders. The change is from a sheet of neoprene rubber to a much thinner, and more resilient, sheet of natural gum rubber. The new gum rubber material may be 1/64 of an inch in thickness, or less. It was found that the greater resilience of the thin gum rubber material makes for a more uniform action in squeezing the air out from between the mask and the film of the mask/film sandwich.

Also new is the method of forming the sheets into nested bladders. Previously, the outermost bladder was attached, around its entire edge, to the underside of the vacuum blanket. This outer bladder formed a floor upon which the concentric nest of inner bladders was built up. The various bladders were attached by the simple expedient of taping them around the edges. Taping the edges is, of course, a non-permanent way of fastening materials together. It was necessary to do this, however, because taping provided a safety valve in the event that the bladders over inflated and endangered the glass top plate. It was better for the bladders to rupture around their edges than for the glass top plate to be shattered.

Now that the combination of a change in the position of the transfer holes and the use of a centrifugal blower have solved the problem of excessive pressurization, the edges of the bladders may be permanently fastened. This has led to a new construction of the nested bladders.

In the new preferred embodiment, the bladders are built up upon a separate, and moderately thick, flexible floor sheet. The outermost bladder is no longer attached to the vacuum blanket. The sheets making up the bladders are glued down around the edges and then sewn in place with a heavy duty industrial sewing machine. Because the outer bladder is no longer attached to the vacuum blanket, construction is far simpler and less expensive than before. Moreover, the bladder assembly may now be completely separated from the vacuum blanket and the vacuum frame. This means that it is now much easier to install the inflatable bladder assembly in an existing vacuum frame, as part of a retrofit kit, without the necessity of significantly altering the vacuum frame. Thus, the separability of the inflated bladder assembly leads to significant advantages in construction.

DETAILED DESCRIPTION OF THE PREFERRED EMBODIMENTS

Figure 1:
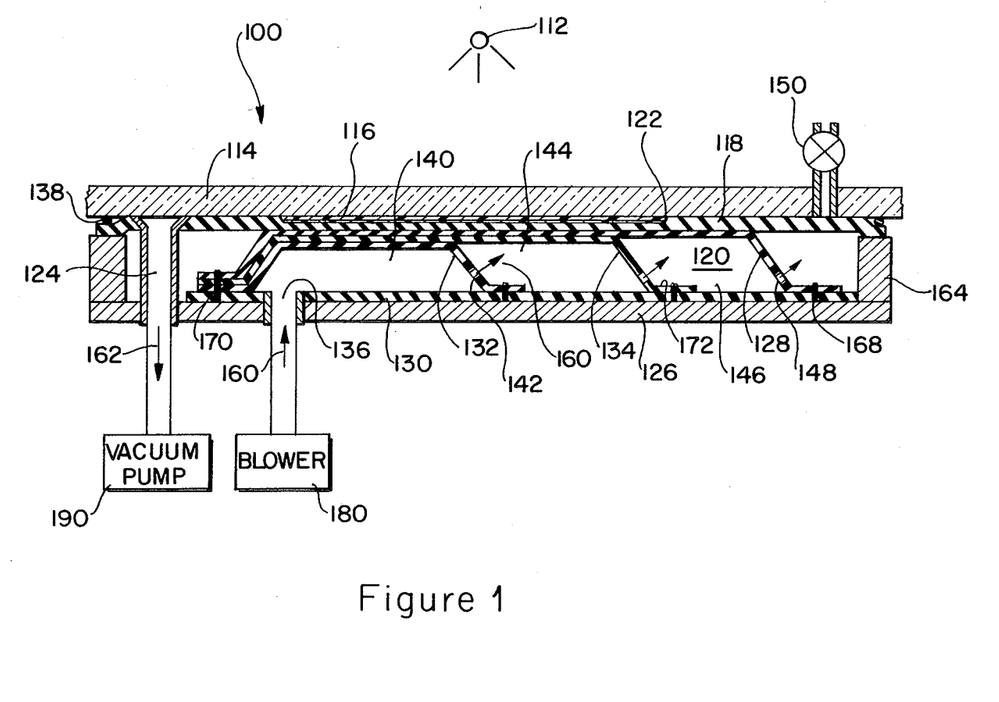
FIG. 1 shows a side sectional view of a vacuum frame according to the present invention.
Figure 2:
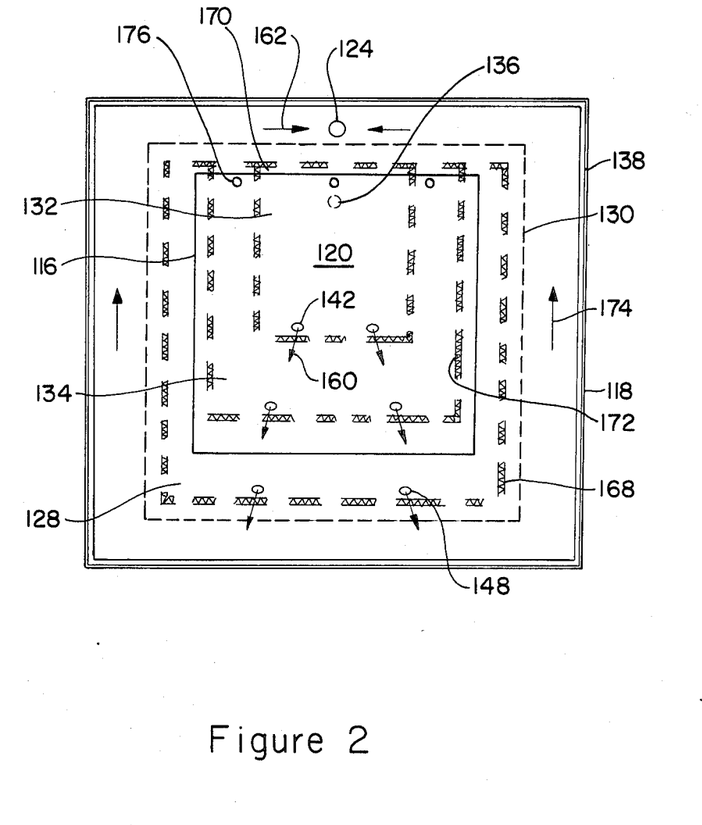
FIG. 2 is a top plan view of a representative blanket/bladder layout for the frame of FIG. 1.

Turning first to FIGS. 1 and 2, there is shown a vacuum frame 100 according to a preferred embodiment. Light shines from a light source 112, through a glass top plate 114 onto a mask (or negative) film/photo film sandwich 116. The top plate 114 may be opened or removed from the rest of the frame 100 so that the mask and photo sensitive material may be placed on a flexible, fluid impervious membrane or pressure (vacuum) blanket 118. Means are provided to retain the top plate 114 in closed contact with the frame. The sandwich 116 is pressed against the glass plate 114 by the force of the flexible pressure blanket 118. The force on the pressure blanket 118 is exerted by the excess air pressure in a nested bladder assembly 120, below the blanket 118, and also by ambient air pressure once a vacuum has been drawn between pressure blanket 118 and glass top plate 114.

The evacuation of air 162 from the region 122 between blanket 118 and glass top plate 114, takes place by extracting it through an evacuation port 124 which is larger in diameter than that used in apparatus initially manufactured and sold in accordance with U.S. Pat. No. 4,504,142. The location of evacuation port 124 determines the head end of the asymmetrical bladder assembly 120, mask/film sandwich 116 and a pinboard (not shown in FIG. 1) within vacuum fame 100. Generally speaking, a pinboard, if one is used, will be placed in the frame in such a way that alignment pins (176 in FIG. 2) thereof will be located next to evacuation port 124. Similarly, the various nested bladders in bladder assembly 120 will also be shifted to be as close as possible to evacuation port 124. Thus, when the bladders inflate, the air between blanket 118 and glass top plate 114 will be progressively squeezed away from the head, or evacuation port 124, end and towards the foot and sides of mask/film sandwich 116.

In order to ensure the vacuum integrity of vacuum frame 100, a continuous sealing bead or gasket, 138 is fastened to the periphery of blanket 118. Sealing bead 138 may be mechanically supported by a flange element 164 which rests on the rigid backing plate 126 of vacuum frame 100.

The nested bladder assembly 120 has a lower wall 130, which is made of a moderately thin, but flexible, sheet of neoprene rubber. The flexible lower wall 130 is supported by rigid backing plate 126 of vacuum frame 100, and the various bladder elements, in the nested bladder assembly 120, are built up on flexible lower wall 130. Each bladder element has an upper wall defined by a partition, which is attached to lower wall 130 in such a way as to create an inflatable bladder. An example of such a partition is sheet 128 which forms the upper wall and divider of the outermost bladder chamber 146. These partitions are preferably formed from 1/64 inch thick (or thinner) sheets of natural gum rubber. Within outer bladder chamber 146 are partitions 132 and 134 which control the flow and distribution of air from an inlet port 136 to all regions of nested bladder assembly 120. The arrangement of partitions 132 and 134, together with outer partition 128 and lower wall 130, is such as to create a plurality of nested bladders, each communicating with adjacent bladders through a series of air transfer holes 142. The number of nested bladders shown in FIGS. 1 and 2 is three, but this does not constitute a limit on the number which may be constructed, in accordance with the present invention. Partitions 132, 134 and 128, are fastened around their lower edges 172, by first gluing the respective edges 172 to flexible lower wall 130, and then by putting stitching with a heavy duty sewing machine along the glued edges, such stitching indicated generally by numerals 168 and 170, as will be discussed in greater detail hereinafter.

In the preferred embodiment, inlet port 136 has been substantially enlarged compared to early production models. This enlargement was made possible by switching, from a pump type high pressure air compressor, to a low pressure, high volume of flow centrifugal blower 180 as the source of pressurized air used to inflate the bladders.

As air 160, derived in the preferred embodiment from a variable speed centrifugal (or axial) blower 180, is pumped into nested bladder assembly 120, through inlet port 136, it first inflates an innermost bladder chamber 140, which is formed by fastening thin, flexible sheet partition 132 around its edges to lower wall 130 of bladder assembly 120. As innermost bladder chamber 140 inflates, it forms a flattened pocket chamber which gently presses a portion of the upper bladder walls against blanket 118. Blanket 118, in turn, presses against a portion of mask/film sandwich 116, near the head of this sandwich, thereby squeezing the air from this portion of the sandwich to the surrounding region.

As innermost chamber 140 inflates and the pressure increases, an air flow 160 starts bleeding from the small holes 142 into the next outer bladder chamber 144 in the sequence. The second partition 134 which defines chamber 144 is constructed in substantially the same way as first partition 132, but it is somewhat larger. The holes 142 are kept sufficiently small that the next, or second, chamber 144 inflates substantially later than first chamber 140. However, holes 142 should not be so small as to cause an excess pressure buildup in any of the bladder chambers. It is crucially important that air transfer holes 142 be placed as close as possible to the glued, and sewn, attachment edges 172 of the bladder partitions so as to prevent their blockage by the other partitions in the bladder assembly during the inflation process. Inflation of second chamber 144 further squeezes the air towards the edges of mask/film sandwich 116. The process of sequential inflation of each chamber continues in a similar fashion until all of the bladder chambers have been inflated.

After the air has bled through and sequentially inflated all the inner chambers of bladder assembly 120, it works its way into, and inflates, the outermost chamber 146. Finally, the pumped air is exited to ambient atmosphere through small openings 148 in outer partition 128. These openings may be fed, by means of an air passage, to a controlling valve (not shown) so that the total system flow is fully regulated. However, in the preferred embodiment, such a valve is not necessary.

A bleeder valve 150 controls the flow of air into the vacuum side of the device. As shown, it is not necessary that bleeder valve 150 be mounted directly above evacuation port 124, provided that the air flow from valve 150 to evacuation port 124 does not disturb blanket 118 during the exposure period.

Bleeder valve 150 is adjusted so that after vacuum chamber 122 has been pumped down, and with the vacuum pump 190 constantly running, the partial pressure in vacuum chamber 122 is approximately half an atmosphere. In fact, the partial pressure may be even closer to atmospheric pressure.

In the preferred embodiment, the inflation pressure in bladder assembly 120 is maintained by means of a constant flow through of pumped air, at just slightly above ambient room air pressure. This provides just enough excess pressure to keep the bladder assembly 120 inflated, without putting so much pressure on blanket 118 that there is danger of glass top plate 114 breaking due to excess force. Moreover, if the pressure differential between adjacent chambers is increased, the air flow necessarily increases, thererby restoring equilibrium. The inflation process is therefore self regulating.

FIG. 2 shows a top view of the bladder assembly of the preferred embodiment and enables an explanation of certain aspects of the design. The assembly 120 of bladders is asymmetrically oriented such that evacuation port 124 defines the head end of the assembly. The opposite side of the assembly from the head is defined as the foot.

Pressure blanket 118 extends to the edge of glass top plate 114 (FIG. 1) and forms a seal with the assistance of continuous bead or gasket 138. Glass top plate 114 may have a metal or wood border (not shown) which holds the glass and against which the bead may press. Pressure blanket 118 extends beyond the region of bladder assembly 120 and includes an available lip, whereby the back frame of the vacuum can press blanket 118 against glass top plate 114 and thereby form the seal for vacuum region 122. As previously discussed, the inflating bladder assembly 120 lies below pressure blanket 118, and assembly 120, in turn, rests on the rigid bottom plate 126 (FIG. 1) of the vacuum frame.

In FIGS. 1 and 2, bladder assembly 120 according to the present invention consists of a nested arrangement of sub bladders. These bladders are formed from thin, natural gum rubber partitions 132, 134 and 128, which are attached, around their edges, to a substantially thicker, but still flexible, lower wall 130. This method of attaching the bladder partitions leaves the central region of each bladder free to balloon out away from the lower wall as air is injected into it.

All the bladders are flat and resemble pockets. When inflated, they form thin, low ceilinged chambers 140, 144 and 146, which resemble pockets. This geometry permits the free inflation of each bladder chamber and also of the series of bladders which are nested within each chamber. To the extent that residual air remains in each of the chambers, filling an inner chamber also tends to partially inflate the surrounding chambers.

The nested bladders are constructed by first fastening the smallest partition sheet 132 around its edges to bottom walls 130 so as to define the innermost bladder chamber. A second, larger partition sheet 134 is laid over the innermost sheet 132 and fastened around its edges to lower wall 130 so as to define the next outer bladder chamber. A third sheet 128 is similarly attached over the two inner sheets to make a third bladder chamber. This sequence of attachment continues until all inner chambers have been formed.

The method for fastening partitions 132, 134, and 128, in the preferred embodiment, to lower wall 130, is to glue them around their edges 172 to lower wall 130, and then to sew them, along glued edges 172, to lower wall 130 with a heavy duty sewing machine. The stitching is represented by numerals 168 and 170. Specifically, the fabrication sequence starts by gluing innermost partition 132 around all four edges. This is followed by stitching along the foot and two adjacent edges of partition 132. The stitching 170 at the head edge does not take place until all bladder partitions have been attached. After inner partition 132 is fastened in place, the middle partitions, represented by numeral 134, are similarly fastened. It is to be noted that, in the preferred embodiment, all partitions are aligned in such a way that their head edges overlap along a common edge. Each successive partition is substantially larger than the next inner partition so the attachment edges along the sides and feet of the various partitions do not overlap. As each partition is fastened in place, its edges are glued down and the foot and two side edges are sewn in place. The head edges are glued, but remain unsewn. Finally, outermost partition 128 is similarly attached to lower wall 130. Once this is done, all head edges of the set of partitions are sewn to lower wall 130 by a single line of stitching 170. The single line of stitching 170 passes through the head edges of all the partitions.

The inflation process begins by drawing air from the vacuum side of blanket 118 through evacuation port 124. Air is also injected into the innermost bladder chamber 140 through inlet port 136 at a flow rate sufficient to insure rapid expansion of the bladder, notwithstanding the communication among several bladder chambers. This pressurizing air, in the preferred embodiment, is derived from a centrifugal blower and has a pressure which is only slightly above ambient room pressure.

When pressurized air is injected into innermost chamber 140, bladder partition 132 inflates, applying, in turn, a gentle pressure to the local region of pressure blanket 118. As the inflation pressure builds up, excess air spills out through small holes 142 into the next bladder chamber 144 which is formed by second partition 134. This spill over begins the inflation of this portion of bladder assembly 120 and, as it inflates, excess air from second chamber 144 again floods through small holes into third chamber 146.

If there are more than three bladder chambers, the process continues until air starts to flood and inflate the outermost bladder chamber (shown here as 146). As the outermost chamber 146 inflates, air starts flowing out of this chamber, to the ambient surrounding world, through final exit ports 148. The flow through these exit ports 148 may be controlled by channeling the air through a valve, but experiments have shown that the sizes of these ports 148 are not critical so long as they are small enough to substantially restrict the flow of air. Therefore, a final exit valve is not normally needed.

In the unusual case where it may be desirable to hold a vacuum for an indefinite period of time, both the input bleeder valve 150 and the final outlet valve could be shut off. When physical access to the vacuum chamber is again desired, both of the valves should be opened so that the pressure differentials can be released.

Normally, air flow continues for the duration of the time that a vacuum is required in vacuum frame 100. The flow is maintained by leaving the vacuum pump, which is connected to evacuation port 124, on. The continuous flow ensures that pressure differentials will be sufficiently small that self sealing of the mask/photo sensitive film edges does not occur and that no residual bubbles of air remain trapped between the mask and the photo material.

It is important that each partition 132, 134 and 128 be fastened in such a way that free movement and inflation of the inner chambers are not hampered. This free movement gives a very uniform application of pressure to blanket 118.

In the preferred embodiment, an important point of the structure is that the nested bladders are not located at the geometric center of pressure blanket 118. Instead, they are offset to be near the center of one edge of the blanket. The practical reason for this offset is that the mask and photo film are usually maintained in lateral registration by a pin system, whereby holes punched in the film sheets are maintained in perfect alignment by placing registration pins 176 through these holes. These alignment holes and pins 176 are normally placed along one edge of the film, denoted here as the head. Because this edge provides a position reference for the mask and photo film alignment, it is important that the air be squeezed out from this edge first. It is also preferred that the air be first squeezed out from the center of this edge and pushed towards the sides.

Accordingly, the arrangement shown in FIGS. 1 and 2 is uniquely suited to this purpose.

By locating evacuation port 124 near the film registration pins 176, the evacuation of region 122 pulls the corresponding portion of pressure blanket 118 up into contact with glass top plate 114 before any other portion of pressure blanket 118. Thus, the evacuation process, by lifting pressure blanket 118 up into the region above the intermost bladder chamber 140, aids in the bladder inflation process. It also helps the progressive squeezing of air from between the mask and photo film. The result is a faster pull up than with any other arrangement.

Note also that the sequential squeezing motion pushes air uniformly in the lateral direction as well as towards the foot of the assembly. This is in distinction to a known roller system which, of necessity, can only push air from one edge across to the opposite edge. Because of the radial flow that this sequential squeezing creates, the amount of effective edge available for evacuation is much larger for the sequentially inflated bladder type device than it is for the roller configuration. Thus, this invention provides for faster evacuation of the air from between the sheets of film, limited only by the time required to inflate the entire bladder assembly 120. The air which is squeezed out along the foot and side edges of the mask/film sandwich 116 for the most part flows to evacuation port 124 along peripheral pathways 174 which lie outside the boundaries of the mask/film sandwich.

Figure 3:
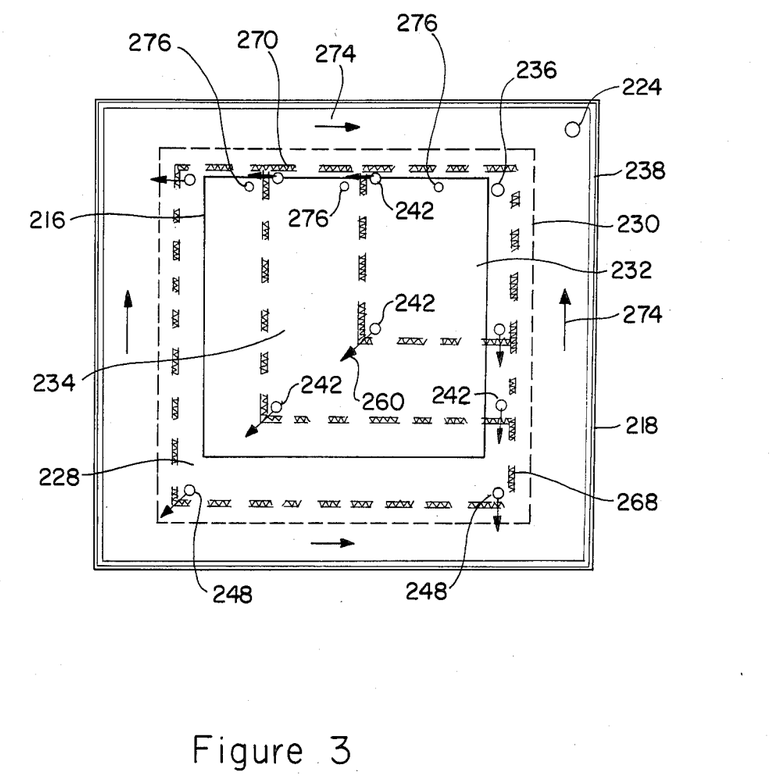
FIG. 3 is a top plan view of an alternative blanket/bladder layout for the frame of FIG. 1.

Referring now to FIG. 3, there is shown a modification of the nesting arrangement of the bladder chambers, in which elements which are identical to those in FIGS. 1 and 2 are identified by the same numerals, augmented by 100. As will be noted, the chambers are arranged diagonally from one corner at the head end to the opposite corner of the vacuum frame.

Having described specific preferred embodiments of the invention with reference to the accompanying drawings, it will be appreciated that the present invention is not limited by those precise embodiments, and that various changes and modifications may be effected therein by one of ordinary skill in the art without departing from the scope of spirit of the invention, as defined by the appended claims.

What is claimed is:

1. A vacuum printing frame comprising:
   a backing plate;
   a pressurizable bladder assembly positioned on said backing plate, said bladder assembly being constructed to be progressively pressurizable from a head end to a foot end of said vacuum printing frame;
   flexible, fluid impervious membrane means positioned above said bladder assembly for supporting a mask and photosensitive sheet;
   transparent plate means movable between an open position for permitting said mask and photosensitive sheet to be positioned on said membrane means, and a closed position for sandwiching said mask and photosensitive sheet between said membrane means and said transparent plate means in an evacuation region defined between said membrane means and said transparent plate means;
   pressurizing means for pressurizing said bladder assembly when said transparent plate is in said closed position to apply a force pressing said photosensitive sheet and said mask against said transparent plate in a predetermined spatial pattern, starting at said head end and terminating at said foot end; and
   evacuation port means fluidly connected with said evacuation region for evacuating said evacuation region, said evacuation port means positioned at said head end of said vacuum frame.

2. A vacuum printing frame according to claim 1; wherein said bladder assembly includes a series of interconnected chambers arranged in alignment from said head end to said foot end; and said pressurizing means includes means for sequentially pressurizing said bladder chamber to apply said force progressively pressing the photosensitive sheet and the mask against the transparent plate means in said predetermined spatial pattern, starting at said head end and terminating at said foot end.

3. A vacuum printing frame according to claim 2; wherein said bladder chambers are arranged in a nested relation for sequentially inflating said bladder chambers to apply said force progressively starting at said head end and proceeding across the mask and sheet to the foot end with a squeegee-like action.

4. A vacuum printing frame according to claim 3; wherein said head end is at one edge of the said frame and said foot end is at an opposite edge of said frame.

5. A vacuum printing frame according to claim 3; wherein said head end is at one corner of said frame and said foot end is at an opposite corner of said frame.

6. A vacuum printing frame according to claim 3; wherein said interconnected bladder chambers are arranged with an innermost chamber near the middle of one edge and the remaining chambers sequentially radiate outward therefrom until all the edges are reached.

7. A vacuum printing frame according to claim 3; wherein said interconnected bladder chambers are arranged with an innermost chamber at one corner of a generally rectangular bladder assembly and the remaining chambers extend generally along a diagonal of the bladder.

8. A vacuum printing frame according to claim 3; wherein said bladder assembly includes a lower wall positioned on said backing plate, and a plurality of partitions defining said bladder chambers, each partition being sealed around lower edges thereof to said lower wall to provide sealed bladder chambers and each partition further sewn along said lower edges thereof to said lower wall.

9. A printing vacuum frame acording to claim 3; wherein said bladder assembly is removable from said backing plate.

10. A vacuum frame according to claim 3; wherein said bladder assembly includes a lower wall positioned on said backing plate, and a plurality of partitions defining said bladder chambers secured to said lower wall, said bladder assembly further including plurality of holes in each partition, close to the securement of the respective partition to said lower wall, to provide fluid communication between adjacent bladder chambers.

11. A vacuum printing frame according to claim 1; wherein said pressurizing means includes a blower supplying air under pressure to said bladder assembly.

12. A vacuum printing frame, comprising:
   a backing plate;
   a pressurizable bladder assembly positioned on said backing plate, said bladder assembly including a lower wall positioned on said backing plate, a plurality of partitions sealed around lower edges thereof to said lower wall and defining a series of interconnected, nested chambers arranged in alignment from and pressurizable from a head end to a foot end of said vacuum printing frame, and a pluralilty of holes in each partition at positions close to the securement of each said respective partition to said lower wall to provide fluid communication between adjacent bladder chambers;

flexible, fluid impervious membrane means positioned above said bladder assembly for supporting a mask and photosensitive sheet;

transparent plate means movable between an open position for permitting said mask and photosensitive sheet to be positioned on said membrane means, and a closed position for sandwiching said mask and photosensitive sheet between said membrane means and said transparent plate means in an evacuation region defined between said membrane means and said transparent plate means;

blower means for supplying air under pressure to said bladder assembly when said transparent plate is in said closed position to apply a force pressing said photosensitive sheet and said mask against said transparent plate in a predetermined spatial pattern, starting from an innermost chamber at said head end to an outermost chamber; and evacuation port means fluidly connected with said evacuation region for evacuating said evacuation region, said evacuation port means positioned at said head end of said vacuum frame.

* * * * *